July 3, 1951  J. N. SCHROCK  2,559,471

SLIDING AUTOMOBILE SHADE

Filed July 6, 1950

INVENTOR
JACOB N. SCHROCK
BY Scott L. Nowiel
ATTORNEY

Patented July 3, 1951

2,559,471

UNITED STATES PATENT OFFICE 2,559,471

SLIDING AUTOMOBILE SHADE

Jacob N. Schrock, Phoenix, Ariz.

Application July 6, 1950, Serial No. 172,350

4 Claims. (Cl. 296—97)

This invention pertains to sliding sun shades for automobiles.

Since the body construction of many automobiles makes no provision for excluding or shielding the interior from direct sunlight many devises have been tried and offered for public use which are intended to shield the interior of the automobile body. Some of these devices swing and tilt within the body in order to shade various portions of the seats of the car; some slide, and recently visors have been applied to the front exterior portions of the body. These devices are not satisfactory for the reason that they are improvised, do not furnish shade where needed without adjustment whenever the direction of travel is changed relative to the position of the sun, and are difficult to manipulate.

In the installation of sliding shades the driver's side of the front seat is of primary importance. Other seat positions can thereafter be supplied with similar devices installed on the right or left sides of the body interior, as desired.

In view of the foregoing, one of the objects of my invention is to provide a unit frame structure in which transparent, translucent or opaque, semi-rigid shade material may be slidably supported so that one shade may be slid longitudinally of the automobile and downward adjacent the front windshield glass of the automobile body, while another sheet of shade material may be slid transversely of the automobile body and downward adjacent a side window therein;

Another object is to provide a frame structure of simple composition which may be easily installed within the roof structure of an automobile body and will provide slideways for semi-rigid shades which may be easily slid forward and downward from the frame so as to lie approximately parallel to the inner faces of both the windshield and the side window.

Another object is to provide a frame of simple construction, as above stated, which may be easily attached to the interior of the top of an automobile body without altering or marring the structure or trim usually found in average automobiles.

Other objects will appear hereinafter.

I attain the foregoing objects by means of the construction and devices illustrated in the accompanying drawings, in which—

Similar numerals refer to similar parts in the several views.

Figure 1:
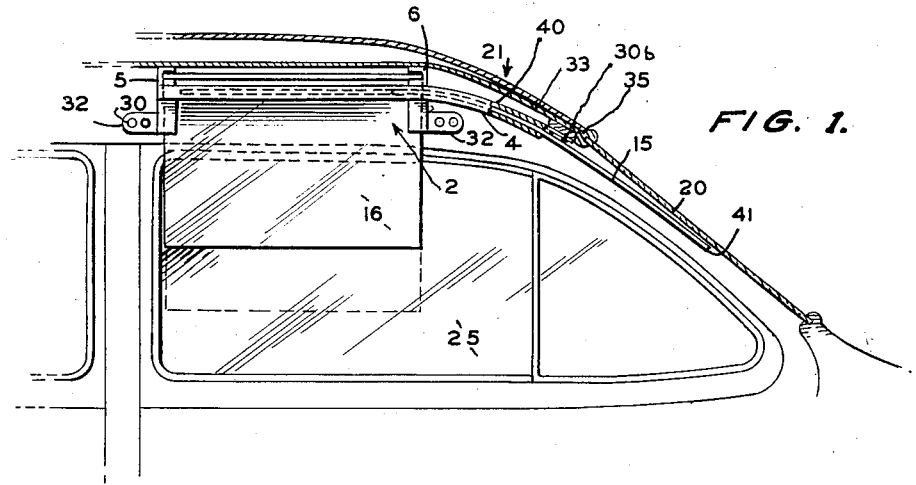
Figure 1 is a side elevation of my sun shade with parts installed in the interior of an automobile body which is shown in section.

The frame 2 is composed of two parallel longitudinal members 3 and 4. These are held in related position by two transverse parallel members 5 and 6. Members 3 and 4 are provided with grooves 7 and 8 formed in their adjacent faces 10. Likewise, transverse members 5 and 6 are provided with grooves 12 and 13 respectively. These grooves are about 1/4 of an inch deep and 1/16 of an inch wide and act as guide grooves for shades 15 and 16.

Preferably, the frame members are made of aluminum bars about 5/8 of an inch square. They are welded at all points of contact. The welds are indicated by numerals 17. The forward portions 19 of frame members 3 and 4 are curved downward to a degree such that grooves 7 and 8 lie in a plane approximately parallel with that of windshield 20 of car body 21. Similarly, the left or outside ends of frame members 5 and 6 are curved downward so that the lower end portions 23 extend in a plane substantially parallel to automobile body window 25.

At the front ends of members 3 and 4 there are flexible tabs 26 and 27. The tabs may be welded to the members or may be made integral therewith, and may be punched with holes 28 to receive attaching screws 30. Tabs 32 are attached to ends 23 of members 5 and 6.

Figure 2:
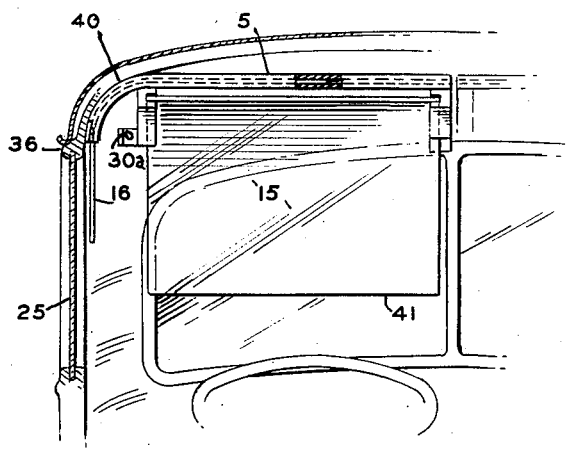
Figure 2 is a rear elevation of my device installed in an automobile body, which is shown in transverse section.
Figure 3:
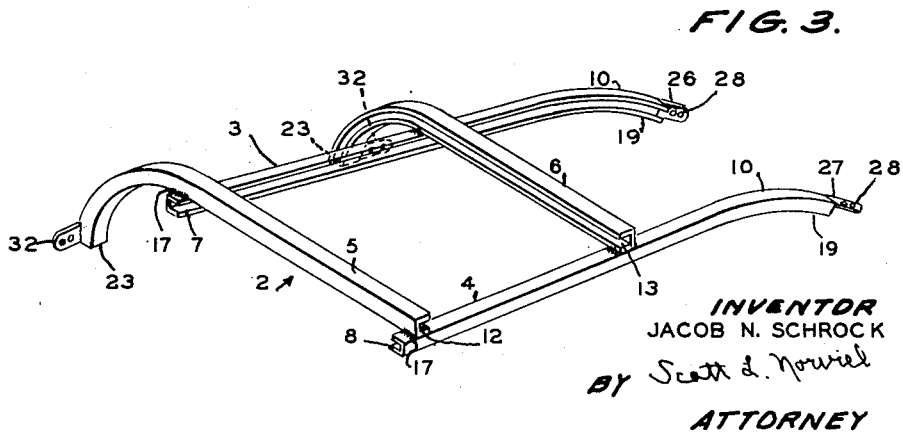
Figure 3 is a perspective view of the frame only, of my device, taken from a position above the frame.

In attaching members 3 and 4 tab 26 on member 3 may be bent outward until it is parallel with the interior of the inner body frame member 33 and attached to this by a metal self threading screw 30a (Fig. 2). Tab 27 may extend from the upper face of member 4 and then be inserted between body frame member 33 and windshield frame 35, or fastened to the outer face of this frame by screws 30b as shown in Figure 1. Optionally, longitudinal frame member 3 may be extended until its tab 26 is in a position to rest on the top of windshield frame 35. Attachment may then be made similar to the attachment of tab 27 on member 4.

Tabs 32 are similarly attached by screws directly to the door frames of the automobile body. Whether the door hinges open or not is immaterial to this illustration. All body structures have frames over the doors.

When the tabs on the front ends of frame members 3 and 4, and on the sides of members 5 and 6 are attached the whole frame is rigidly supported and no support is needed for the inner ends of any of the frame members.

Having provided a frame, as above described, I make use of semi-rigid transparent material for the shades. I find that a number of the recently developed plastic materials, such as "Lucite," "Accolite" or "Vinylite" may be used for this purpose. These substances may be generally described as made of flexible, transparent material, stained as desired to filter out undesired portions of the sun's rays. When such material is made $\frac{1}{16}$ of an inch in thickness and fitted into the grooves of parallel frame members shades 15 and 16 are provided which need no additional support.

It is to be noted that each shade is bent at 40 as it follows the curve adjacent the ends of each of the pans of the frame members. These bends aid in stiffening so that transverse rigidity of each shade is maintained. The plastic material from which the shades are made is admirably suited to this function. From the curved portion the shade material extends straight outward following the plane desired. It needs no further framing or edging and the raw edges 41 do not detract from its appearance. The outer end portions 42 and 43 of each shade may, therefore, be extended as much as 6 or 8 inches, as desired, by merely grasping the forward edges of either shade and sliding it outward. When thus fully extended (as illustrated) ample shade is provided for the driver's seat. Obviously, a similar right counterpart of structure 2 may be installed on the right side of the front seat, and likewise, installations may be made in the rear of the car body.

This type of shade is shown installed within an automobile body known to the trade as a "hard top" body. All parts are within the body. No attempt is made to show its adaption to soft or folding tops. When installed it is rigid, inconspicuous and provides easily replaceable shades which operate more easily than more complicated devices now in use. The shades may be evenly tinted any color desired, or may be tinted, to have progressively deeper colors from front edge 41 toward the rear. The material from which the shades are made has sufficient stiffness to be supported in and run in the frame member grooves, but is sufficiently flexible to follow around the curves in these members. These properties give it sufficient resistance to movement so that each shade will remain in the position to which it is adjusted without the need of catches or locks.

In view of the foregoing it will be understood that I have provided an efficiently operating, simplified shade, which is easily installed and shades the side as well as the front of the compartment in which it is installed.

I claim:

1. A sunshade for installation in the interior of an automobile body having a solid top, a windshield frame, and a side door frame, composed of a pair of longitudinal frame members arranged in parallel spaced relation having downward bends at their forward ends and shade guide grooves in their adjacent faces, a pair of transversely extending parallel frame members superposed over said longitudinal members, and attached thereto, having portions at their ends curved downward and provided with shade guide grooves on adjacent faces, shades of semi-hard flexible material having their edges slidably retained in the opposite guide grooves of each of said pairs of frame members, and flexible attaching tabs attached to the ends of said frame members adapted for attachment to said windshield frame and door frame respectively.

2. A sunshade for installation within the top portion of an automobile body having a solid top, a windshield with a frame, and a side door with a frame, composed of a pair of longitudinally extending frame members horizontally disposed in parallel spaced relation having their forward end portions adjacent said windshield frame curved downward with the ends directed substantially parallel to said windshield, shade holding grooves formed in the adjacent faces of said members and flexible tabs attached to the said curved ends of said members adapted to be secured to said automobile windshield frame, a pair of horizontally disposed frame members attached to the tops of and extending transversely to said longitudinal frame members in mutual parallel spaced relation having shade grooves on their adjacent faces, downwardly curved end portions adjacent one side of said parallel frame members and tabs at their ends adapted for attachment to the side door frame of an automobile body, together with shades of semi-rigid, translucent shade material slidably supported in said grooves between each of said frame materials.

3. In a sun shade, for installation within an automobile body having a top, a windshield within a frame at the forward end, and a door frame at one side of the combination therewith of a frame including a pair of parallel longitudinal members disposed horizontally in spaced relation and having flat adjacent faces provided with shade receiving grooves and downwardly curved forward ends provided with attaching tabs adapted to be secured to said windshield frame; a pair of spaced parallel transverse frame members attached to said longitudinal members having flattened adjacent surfaces provided with shade receiving grooves and having downward curved portions at their ends adjacent said door frame, provided with tabs adapted to be attached to said door frame; a longitudinally operatable shade of semi-hard translucent tinted plastic material slidably retained in the grooves in said longitudinal frame members; a transversely operatable shade of semi-hard translucent tinted plastic material slidably retained in the grooves in said transverse frame members; said shades being retained between said pairs of frame members so that the downward curves in the end portions thereof form a cross bend in each of said respective shades sufficient to give supporting stiffness thereto when extended from the ends of said pairs of frame members.

4. A sun shade for installation within an automobile body top including in combination a frame consisting of a pair of spaced horizontally disposed parallel longitudinally extending shade supporting members having shade receiving grooves along their opposite adjacent faces, each being curved downward at their forward ends and provided with attaching tabs; a pair of spaced transversely extending parallel shade supporting members attached crosswise to said longitudinal members having shade receiving grooves along their opposite faces; each extending beyond the longitudinal member on one side of said frame with their end portions curved downward and provided with attaching tabs; a longitudinally movable shade composed of semi-hard tinted plastic material slidably supported in the grooves in longitudinal members and arranged to extend downward from the forward ends thereof following the curve of said members to form a transverse stiffening bend; a transversely movable shade composed of semi-hard tinted plastic material slidably supported in the grooves in said transverse frame members, arranged to extend downward from the curved end portions thereof following the curve of the groove therein to form a stiffening bend.

JACOB N. SCHROCK.

REFERENCES CITED

The following references are of record in the file of this patent:

UNITED STATES PATENTS

| Number | Name | Date |
| --- | --- | --- |
| 2,358,173 | McFadyen | Sept. 12, 1944 |